United States Patent
Cao

(10) Patent No.: US 9,386,061 B2
(45) Date of Patent: Jul. 5, 2016

(54) ELECTRONIC DEVICE AND METHOD FOR MANAGING NETWORK BANDWIDTH DISTRIBUTION

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Dan Cao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 215 days.

(21) Appl. No.: 14/160,525

(22) Filed: Jan. 21, 2014

(65) Prior Publication Data

US 2015/0006678 A1 Jan. 1, 2015

(30) Foreign Application Priority Data

Jun. 26, 2013 (CN) .......................... 2013 1 0261086

(51) Int. Cl.
*H04L 29/06* (2006.01)
*H04N 21/24* (2011.01)
*H04N 21/262* (2011.01)

(52) U.S. Cl.
CPC .............. *H04L 65/60* (2013.01); *H04L 65/80* (2013.01); *H04N 21/2402* (2013.01); *H04N 21/26216* (2013.01)

(58) Field of Classification Search
CPC . H04L 41/0896; H04L 41/5009; H04L 47/10; H04L 47/25; H04H 20/42; H04N 21/2385; H04W 28/24
USPC .......................................... 709/219, 223–227
See application file for complete search history.

(56) References Cited

U.S. PATENT DOCUMENTS

| | | | | |
|---|---|---|---|---|
| 2008/0195745 A1* | 8/2008 | Bowra | ................ | H04L 12/5695 709/231 |
| 2009/0182889 A1* | 7/2009 | Hurst | ................ | H04N 21/4325 709/231 |
| 2012/0102191 A1* | 4/2012 | Rabii | .................... | G06F 9/5011 709/224 |
| 2012/0137274 A1* | 5/2012 | Tsai | ................... | G06Q 10/0639 717/128 |
| 2013/0326166 A1* | 12/2013 | Desai | .................... | G06F 9/5016 711/158 |

* cited by examiner

Primary Examiner — Ruolei Zong
(74) Attorney, Agent, or Firm — ScienBiziP, P.C.

(57) ABSTRACT

An electronic device is connected to a network, and includes a storage unit, the storage unit stores a speed of data transmission required by the electronic device when the electronic device is displaying a video from the network. A method for managing network bandwidth distribution of an electronic device includes the following steps. Detecting a speed of data transmission the network provided to the video displayed by the electronic device. Comparing the detected speed with the stored speed. If the detected speed is greater than the stored speed, decreasing a network bandwidth provided to the video. If the detected speed is less than the stored speed, controlling the running application of the electronic device which occupies the network bandwidth to stop running.

14 Claims, 2 Drawing Sheets

ELECTRONIC DEVICE AND METHOD FOR MANAGING NETWORK BANDWIDTH DISTRIBUTION

FIELD

The present disclosure relates to electronic devices, and particularly to an electronic device capable of managing network bandwidth distribution and a method for managing network bandwidth distribution of the electronic device.

BACKGROUND

When an electronic device connected to a network is displaying a network video, the network needs to provide a large amount of bandwidth to the electronic device to enable a great data transmission speed. Since a total network bandwidth is limited, if there are other electronic devices connected to the network, less network bandwidth may be provided to the other electronic devices and traffic may arise. Thus, different qualities of data transmission may be provided to different users.

BRIEF DESCRIPTION OF THE DRAWINGS

Implementations of the present disclosure will now should be described, by way of example only, with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views. The description is not to be considered as limiting the embodiments described herein.

DETAILED DESCRIPTION

Figure 1:
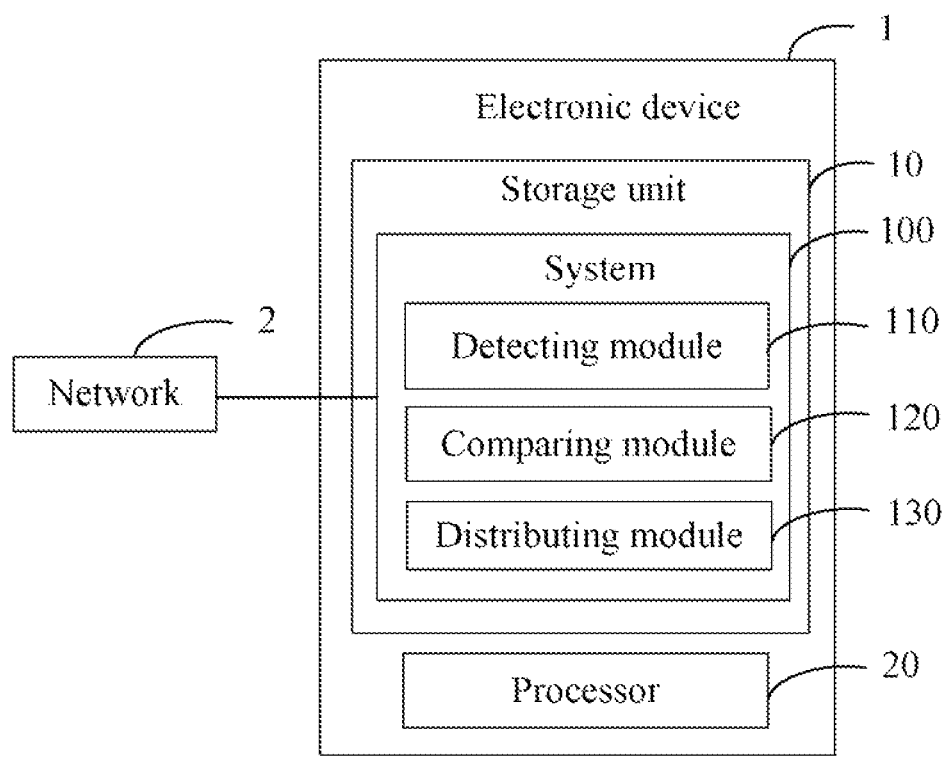
FIG. 1 is a block diagram of an electronic device, in accordance with an exemplary embodiment.

FIG. 1 is a block diagram of an electronic device 1 according to an exemplary embodiment. The electronic device 1, such as a computer or a server, is connected to a network 2 which provides data transmission service to the electronic device 1. In the illustrated embodiment, the network 2 is a local area network. The electronic device 1 includes a storage unit 10 and a processor 20. The storage unit 10 stores data at a speed S0 of data transmission required by the electronic device 1 when the electronic device 1 is displaying a video from the network 2. The storage unit 10 further includes a system 100 for managing network bandwidth distribution to the electronic device 1 when the electronic device 1 is displaying a video. The system 100 includes a variety of modules executed by the processor 20 to provide the functions of the system 100.

In the example illustrated in FIG. 1, the system 100 includes a detecting module 110, a comparing module 120, and a distributing module 130.

The detecting module 110 detects whether electronic device 1 is displaying a video from the network 2, if so, the detecting module 110 further detects the speed S of data transmission the network 2 provided to the video displayed by the electronic device 1.

The comparing module 120 compares the detected speed S with the stored speed S0.

The distributing module 130 decreases the network bandwidth provided to the video if the detected speed S is greater than the stored speed S0, thereby enabling the network 2 to provide greater network bandwidth to other running applications of the electronic device 1 or other electronic devices (not shown) connected to the network 2.

If the detected speed S is less than the stored speed S0, the distributing module 130 controls at least one running application of the electronic device 1 which occupies the network bandwidth to stop running, thereby enabling the network 2 to provide greater network bandwidth to the video displayed by the electronic device 1.

In at least one embodiment, if there are at least two running applications which occupy the network bandwidth before the electronic device 1 displays a video, the distributing module 130 controls the running applications to stop running according to the total times each running application is operated by a user within a predetermined period (thirty minutes before the video begins to be displayed, for example). In the illustrated embodiment of FIG. 1, the distributing module 130 sorts the running applications of the electronic device 1 in a sequence according to the total times each running application is operated within the predetermined period, and the running application operated for more times is arranged first in the sequence. The distributing module 130 controls the running application in front of the sequence to stop running In the embodiment, the total times is a number of times each running application is operated. For example, a website is operated three times by the user, and a game is operated two times by the user, the distributing module 130 first controls the game to stop running In an alternative embodiment, the total times may be an amount of time each running application is operated.

In an alternative embodiment, if there are at least two running applications which occupy the network bandwidth before the electronic device 1 displays a video, the distributing module 130 may control the running applications to stop running according to the memory size required for running each running application. In the illustrated embodiment, the distributing module 130 sorts the running applications of the electronic device 1 in a sequence according to the memory size required for running each running application, and the running application which requires greater memory size is arranged first in the sequence. The distributing module 130 controls the running application in front of the sequence to stop running.

Figure 2:
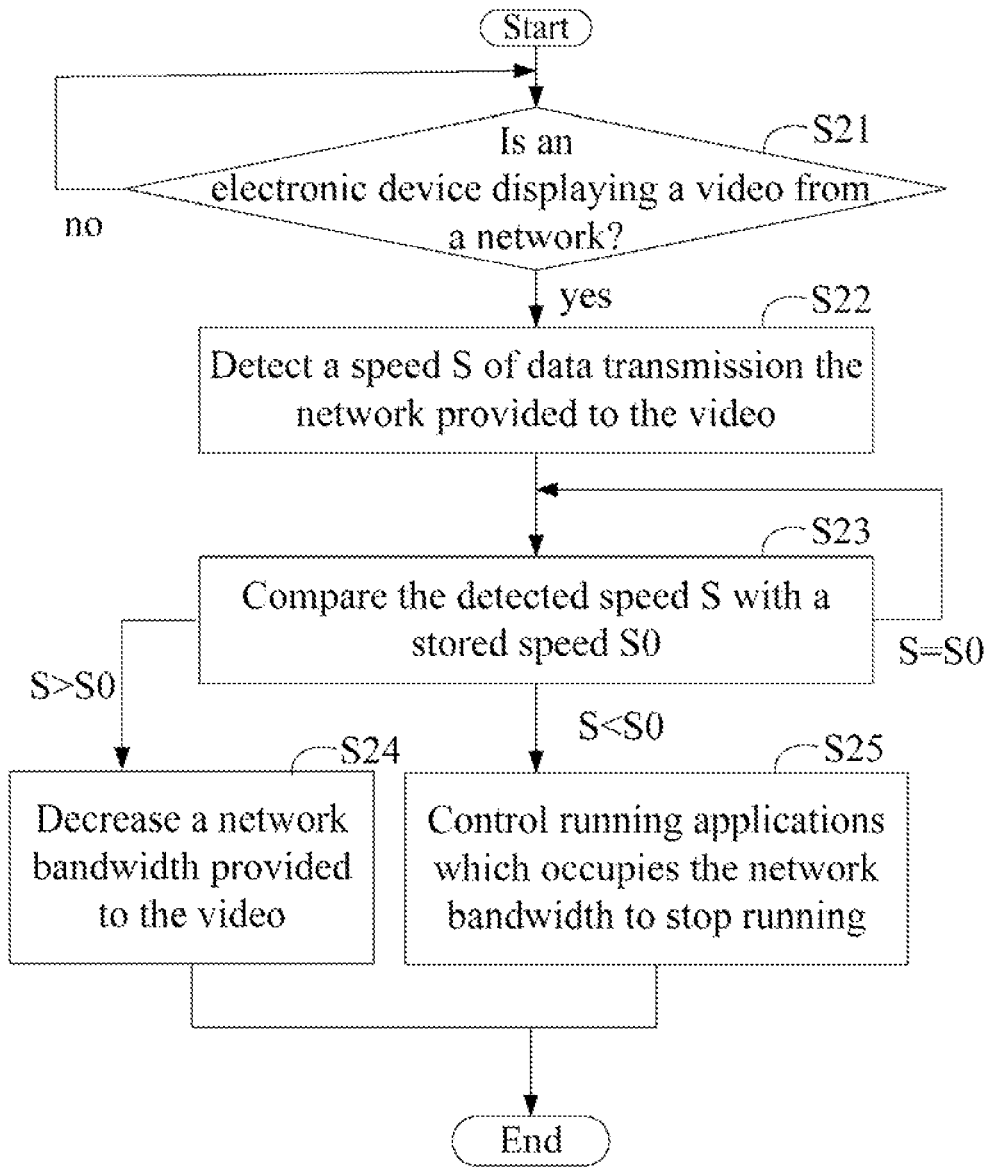
FIG. 2 is a flowchart of a method for managing network bandwidth distribution, in accordance with an exemplary embodiment.

FIG. 2 is a flowchart of a method for managing network bandwidth distribution of the electronic device 1, in accordance with an exemplary embodiment.

In step S21, the detecting module 110 whether electronic device 1 is displaying a video from the network 2, if yes, the procedure goes to step S 22; otherwise, the procedure goes back to step S21.

In step S22, the detecting module 110 detects the speed S of data transmission the network 2 provided to the video displayed by the electronic device 1.

In step S23, the comparing module 120 compares the detected speed S with the stored speed S0. If the detected speed S is greater than the stored speed S0, the procedure goes to step S24; if the detected speed S is less than the stored speed S0, the procedure goes to step S25; if the detected speed S is equal to the stored speed S0, the procedure goes back to step S23.

In step S24, the distributing module 130 decreases the network bandwidth provided to the video displayed by the electronic device 1, thereby allowing the network 2 to provide greater network bandwidth to other running applications of the electronic device 1 or other electronic devices (not shown) connected to the network 2.

In step S25, the distributing module 130 controls at least one running application of the electronic device 1 which occupies the network bandwidth to stop running, thereby allowing the network 2 to provide greater network bandwidth to the video displayed by the electronic device 1.

It is believed that the present embodiments and their advantages will be understood from the foregoing description, and it will be apparent that various changes may be made thereto without departing from the scope of the disclosure or sacrificing all of its material advantages, the examples hereinbefore described merely being exemplary embodiments of the present disclosure.

What is claimed is:

1. An electronic device connected to a network, the electronic device comprising:
    a storage unit storing a speed of data transmission required by the electronic device when the electronic device is displaying a video from the network, and further including a plurality of modules; and
    a processor to execute the plurality of modules;
    wherein the plurality of modules comprises:
        a detecting module to detect whether the electronic device is displaying a video from the network, and detect a speed of data transmission the network provided to the video displayed by the electronic device;
        a comparing module to compare the detected speed with the stored speed; and
        a distributing module to decrease a network bandwidth provided to the video displayed by the electronic device if the detected speed is greater than the stored speed, to allow the network to provide greater network bandwidth to other running applications of the electronic device or other electronic devices connected to the network;
        and further control at least one of the other running applications which occupies the network bandwidth to stop running if the detected speed is less than the stored speed.

2. The electronic device of claim 1, wherein if there are at least two running applications which occupy the network bandwidth before the electronic device displays the video, the distributing module is configured to control the running applications to stop running according to total times each running application is operated by the user within a predetermined period.

3. The electronic device of claim 2, wherein the distributing module is configured to sort the running applications of the electronic device in a sequence according to total times each running application is operated within the predetermined period, the running application operated for more times is arranged first in the sequence, and the distributing module is further configured to control the running application in front of the sequence to stop running.

4. The electronic device of claim 3, wherein the total times is a number of times each running application is operated.

5. The electronic device of claim 3, wherein the total times is an amount of time each running application is operated.

6. The electronic device of claim 1, wherein if there are at least two running applications which occupy the network bandwidth before the electronic device displays a video, the distributing module is configured to control the running applications to stop running according to a memory size required for running each running application.

7. The electronic device of claim 6, wherein the distributing module is configured to sort the running applications of the electronic device in a sequence according to the memory size required for running each running application, the running application which requires greater memory size is arranged first in the sequence, and the distributing module is further configured to control the running application in front of the sequence to stop running.

8. A method for managing network bandwidth distribution of an electronic device, the electronic device connected to a network and comprising a storage unit, the storage unit storing a speed of data transmission required by the electronic device when the electronic device is displaying a video from the network, the method comprising:
    detecting whether the electronic device is displaying a video from the network;
    detecting a speed of data transmission the network provided to the video displayed by the electronic device;
    comparing the detected speed with the stored speed;
    decreasing a network bandwidth provided to the video displayed by the electronic device if the detected speed is greater than the stored speed, to allow the network to provide greater network bandwidth to other running applications of the electronic device or other electronic devices connected to the network; and
    controlling at least one of the other running applications which occupies the network bandwidth to stop running if the detected speed is less than the stored speed.

9. The method of claim 8, wherein the step decreasing a network bandwidth provided to the video displayed by the electronic device if the detected speed is greater than the stored speed further comprises:
    determining whether there are at least two running applications which occupy the network bandwidth before the electronic device displays the video; and
    when there are at least two running applications, controlling the running applications to stop running according to total times each running application is operated by the user within a predetermined period.

10. The method of claim 9, wherein the step controlling the running applications to stop running according to total times each running application is operated by the user within a predetermined period further comprises:
    sorting the running applications of the electronic device in a sequence according to total times each running application is operated within the predetermined period;
    arranging the running application operated for more times first in the sequence; and
    controlling the running application in front of the sequence to stop running.

11. The method of claim 10, wherein the total times is a number of times each running application is operated.

12. The method of claim 10, wherein the total times is an amount of time each running application is operated.

13. The method of claim 8, wherein the step decreasing a network bandwidth provided to the video displayed by the electronic device if the detected speed is greater than the stored speed further comprises:
    determining whether there are at least two running applications which occupy the network bandwidth before the electronic device displays a video; and
    when there are at least two running applications, controlling the running applications to stop running according to a memory size required for running each running application.

14. The method of claim 13, wherein the step controlling the running applications to stop running according to a memory size required for running each running application further comprises:
- sorting the running applications of the electronic device in a sequence according to the memory size required for running each running application;
- arranging the running application which requires greater memory size first in the sequence; and
- controlling the running application in front of the sequence to stop running.

* * * * *